March 28, 1967 J. BERNE 3,311,079
STEERING SYSTEM FOR DYNAMICALLY POSITIONING A VESSEL
Filed July 22, 1965 6 Sheets-Sheet 5

INVENTOR
JEAN BERNE
BY Bacon & Thomas
ATTORNEYS

Fig. 8

United States Patent Office 3,311,079
Patented Mar. 28, 1967

3,311,079
STEERING SYSTEM FOR DYNAMICALLY
POSITIONING A VESSEL
Jean Berne, Vernouillet, France, assignor to Institut
Francais du Petrole, des Carburants et Lubrifiants,
Rueil-Malmaison, Seine-et-Oise, France
Filed July 22, 1965, Ser. No. 474,128
Claims priority, application France, July 22, 1964,
982,700
7 Claims. (Cl. 114—144)

This invention relates generally to a steering system for dynamically positioning a floating installation, and more particularly to a controlled propulsion system and apparatus whereby a floating installation may be moved to a predetermined point with a predetermined heading, and may be maintained in such a position.

It is often desirable to maintain a floating installation at a fixed position and with a desired heading, in spite of the disturbing external forces exerted on this installation, particularly by winds and currents. This problem arises, for example, during underwater drilling operations performed from ships or floating platforms. In such operations it is necessary to position the ship as accurately as possible in order to prevent dangerous stresses on the drill string. The ship's anchoring can be effected either in a conventional manner, i.e. by use of anchor-and-chain means, or by means of a dynamic positioning method which consists of maintaining both the desired position and the heading of the ship exclusively by means of propulsion units.

Accordingly, it is an object of the present invention to provide a steering system for dynamically maintaining the desired position and heading of a ship by controlling the direction and magnitude of the individual thrusts exerted by at least two rotatable propulsion units, in order to counteract the action of external forces tending to displace the ship. This system is of particular interest for vessels operating in deep water, where conventional anchoring systems would require great lengths of chains or cables for connecting the ship to the immersed anchors and in addition would often not permit a sufficiently precise positioning.

Another more specific object of the present invention is to provide a manually controlled mechanical system for steering a floating installation, according to the dynamic positioning method.

The objects and advantages of the invention will be more easily understood from the following description, when taken in connection with the accompanying drawings, in which.

Figure 1:
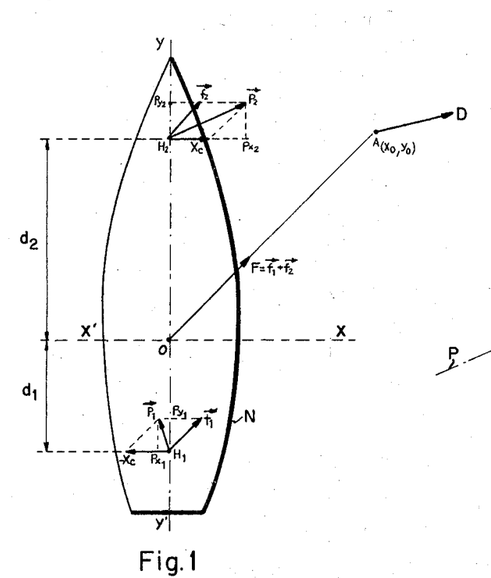
FIG. 1 is a schematic diagram showing the forces to be exerted by the propulsion units to bring a ship to a desired position and heading in accordance with the teachings of the present invention.

Referring now more specifically to the drawings, the letter N is used in FIG. 1 to generally designate a vessel having a center of gravity O, a longitudinal axis represented by the dotted line Y'OY and a transverse axis represented by the dotted line X'OX, both axes passing through the center of gravity O. The operation illustrated in FIG. 1 relates to the maneuvering of the vessel N from the position shown in heavy lines to a second position wherein the center of gravity O is positioned over a point A, which has coordinates $X_o$ and $Y_o$, and to give the vessel a heading represented by the vector $\overrightarrow{AD}$.

Figure 3:
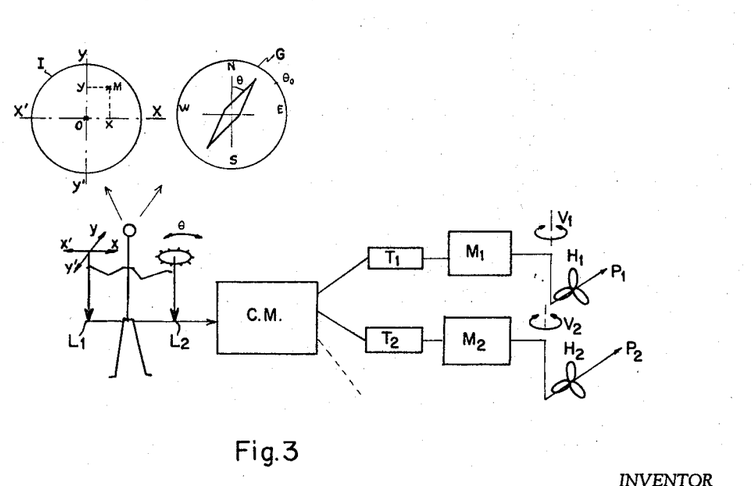
FIG. 3 is a schematic representation of a steering system for dynamically positioning a ship in accordance with the teachings of this invention.

The vessel is provided with conventional equipment for determining its position and heading at any given moment, such equipment being illustrated by way of example in FIG. 3 as an inclinometer or tilt meter I for determining the position and a gyrocompass G for determining the heading. The inclinometer I is conventionally provided with a taut cable stretched between the ship N and a mass moored on the seat bottom, the latter being represented by the point M on the inclinometer I shown in FIG. 3. The inclinometer operates by measuring the deflection angles of the cable with respect to two vertical planes preferably disposed at right angles with respect to one another, the vertical planes employed in the present example being those in which the longitudinal axis Y'OY and the transverse axis X'OX are disposed. The depth of the water may be determined by any known means, such as sonar, and with the deflection angles provided by the inclinometer I, it is easy to compute the coordinates $x, y$ of the reference point O, which represents the center of gravity of the ship N on the inclinometer I of FIG. 3. The precision of the desired positioning can be characterized by the distance $d$ between the actual position of the reference point O of the ship and the desired location at point A. The specific precision will be $d/h$, where $h$ is the water depth. It will be understood, of course, that the position and heading of the ship can be determined by means of any suitable device other than the inclinometer I and the gyrocompass G. For example, one can employ moored reference buoys and/or anchors, optionally in combination with radar and/or sonar detection equipment or the like.

While the ship is being maneuvered, it is necessary to counteract the external forces exerted thereon, particularly those caused by the wind, the currents and the swell. These forces can be resolved into a resultant torque applied to the ship, which may in some instances be of a large magnitude. However, under ordinary operational conditions, these forces will not vary greatly from an average value and, since the movement of the ship in the vicinity of the anchoring position A will be relatively slow, it is possible for all practical purposes to consider that the individual thrusts exerted by the propulsion units are counteracted only by the inertia of the ship.

Figure 2:
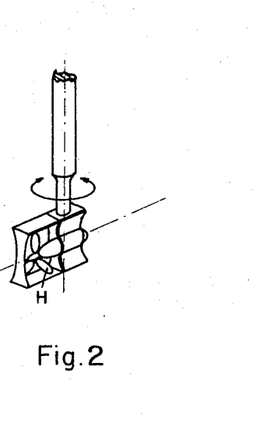
FIG. 2 shows, by way of example, a type of propulsion unit which can be used in combination with a steering system according to the invention.

The dynamic positioning of the ship N in FIG. 1 to the position A with the heading represented by the vector $\overrightarrow{AD}$ is achieved by using at least two propulsion units of the outboard type, mounted on the underside of the ship at positions remote from the center of gravity O. These propulsion units may be of the type indicated generally by the letter H in FIG. 2, which are mounted for rotation about a vertical axis V, to effect a variable thrust direction P, but it will be understood that any other type of propulsion unit may be employed for the same purpose as long as it can provide for a variable direction of thrust.

In the embodiment of FIG. 1, two such propulsion units are mounted on the ship N at points $H_2$ and $H_1$ spaced fore and aft, respectively, of the center of gravity O, the thrust directions of these propulsion units being rotatably adjustable about axes perpendicular to the plane of FIG. 1.

The dynamic positioning of the ship N is achieved by exerting at $H_1$ and $H_2$, respectively, two thrusts, $P_1$ and $P_2$, having the respective components $Px_1$, $Py_1$, and $Px_2$, $Py_2$, said two thrusts being such that they can be resolved into a resulting force $F = f_1 + f_2$, moving the center of gravity O of the ship to the point A, and to a torque $Xc$, $-Xc$, tending to drive the ship in rotation around the point O, so as to bring the ship's longitudinal axis into alignment with vector $\overrightarrow{AD}$.

It should be recognized, however, that if one desires to move the ship along any direction which does not coincide with the longitudinal axis of the ship, by exerting on the latter a resulting force applied to the center of gravity and having such a direction, the heading of the vessel will be modified and the vessel will not move exactly along the direction of the resulting force applied, because the head resistance center of the ship does not coincide with its center of gravity O. Such a coupling phenomenon will be the less important as the relative speed of the ship with respect to the water on one hand, and the proportion of the length to the breadth of the ship on the other hand, becomes smaller. Coupling phenomena similar to those due to the hydrodynamic resistance of the hull exist as a result of the aerodynamic resistance of the superstructure of the ship. The pilot must accordingly at all times take these coupling phenomena into consideration and react by simultaneously adjusting both the thrust orientation and the magnitude of each propulsion unit.

In view of the foregoing, it will be understood that when two propulsion units are employed, as in the embodiment of FIG. 1, it is necessary to have an orientation control means for each of the two propulsion units and thrust-magnitude control means for each of the two propulsion units. Since it would be practically impossible for an operator to handle all four of these control means in executing the maneuvers required to give the ship the desired position and heading, it is a primary objective of the present invention to provide a mechanical linkage between the various control means so that the pilot can readily execute these maneuvers through the agency of only two control levers, one for controlling the translation displacements of the ship and the other for controlling the rotation about its center of gravity. The invention contemplates that similar control means can be applied to two propulsion groupings, each comprising a plurality of propulsion units, the control means serving to provide the simultaneous adjustments for all propulsion units in each group.

Figure 4:
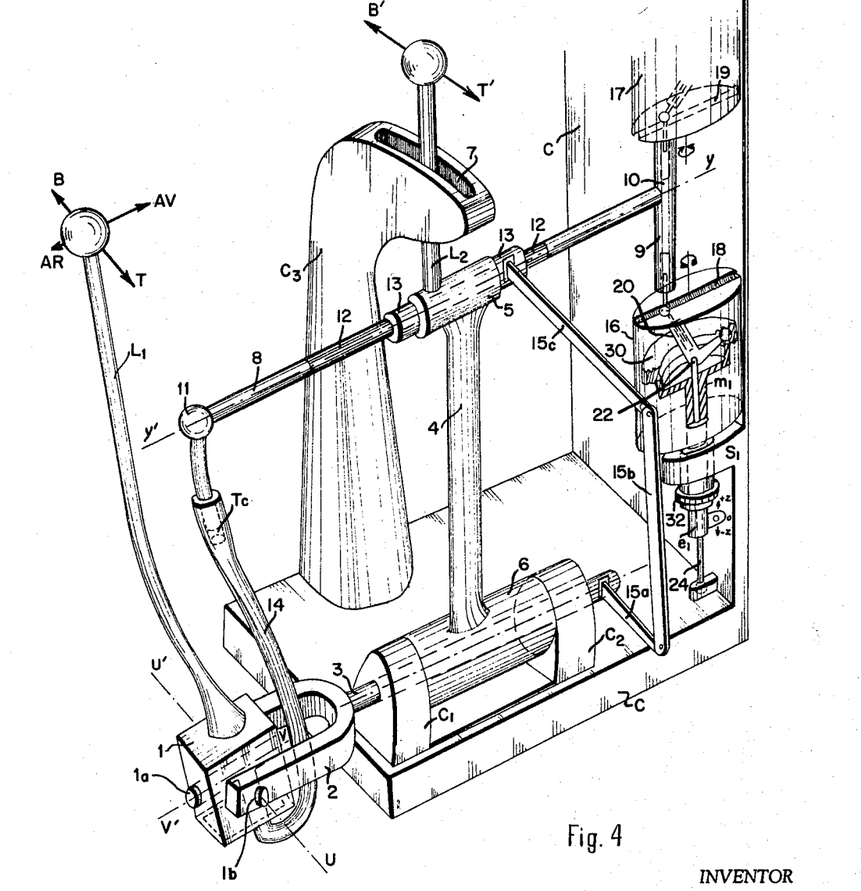
FIG. 4 is a fragmentary perspective view of a first embodiment of steering apparatus which may be employed in the system of FIG. 3.
Figure 5:
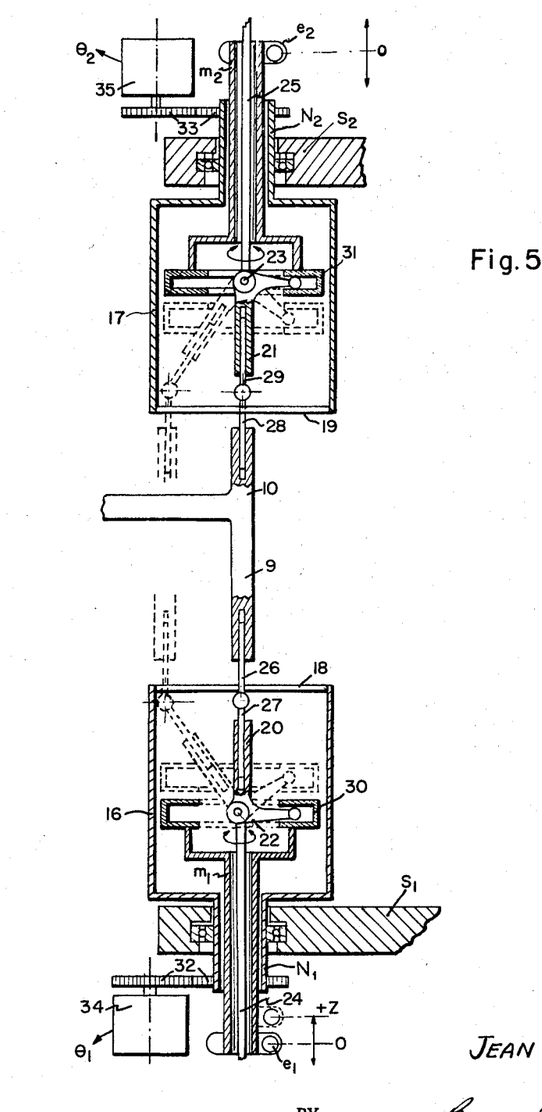
FIG. 5 is a vertical section of a part of the system represented in FIG. 4.

A specific embodiment of the control means of the present invention is illustrated in detail in FIGS. 4 and 5 wherein the reference letter $L_1$ is employed to designate a displacement control lever having a downwardly open socket member 1 at its lower end. A shaft 1a is journalled transversely in socket member 1 within the open socket portion thereof, being disposed along a transverse axis $v'v$. Stub shafts 1b project outwardly from the opposite side walls of socket member 1 on an axis $u'u$, which is perpendicular to the axis $v'v$. A yoke-shaped member 2 is mounted for pivotal movement with respect to socket member 1 by having its arms journalled adjacent their outer extremities on the stub shafts 1b. The bight portion of yoke-shaped member 2 is in turn integrally mounted on one end of a first transmission shaft 3 rotatably journalled in spaced bearing blocks $C_1$ and $C_2$ mounted on a supporting platform C.

A lower sleeve 6 is rotatably mounted on the transmission shaft 3 between bearing blocks $C_1$ and $C_2$ and forms part of a generally H-shaped connection between the first transmission shaft 3 and a second transmission shaft 8.

Specifically, the lower sleeve 6 is fixedly connected by a connecting strut 4 to an upper sleeve 5 disposed on an axis parallel to the axis of the sleeve 6, the sleeve 6 being freely pivotable on the transmission shaft 3. Thus, strut 4 and sleeve 5 can be swung forwardly and rearwardly, as by a control lever $L_2$ rigidly mounted on the upper portion of the sleeve 5. A stanchion member $C_3$ extends upwardly from the platform C and has a vertically open guide slot 7 formed through a forwardly projecting portion provided at its upper end. The lever $L_2$, which serves as a heading control lever, extends through the slot 7 and is guided therein for swinging movement of sleeve 5 as the strut 4 is pivoted about the axis of transmission shaft 3.

A second transmission shaft 8 is mounted rotatably about its axis $y'y$, passing through the upper sleeve 5. At one end the shaft 8 is T-shaped in configuration being provided with radial arms 9 and 10 extending in diametrically opposite directions. The opposite end of transmission shaft 8 is connected by a ball-and-socket connection 11 to a depending connecting rod 14 and is freely rotatable with respect thereto. At least the central portion 12 of the shaft 8 is splined for engagement with an internally splined sleeve 13, which is in turn journalled for rotation within the sleeve 5. Thus, the transmission shaft 8 is adapted to be rotatably driven by the sleeve 13, but it may be readily displaced longitudinally with respect thereto.

The connecting rod 14 extends downwardly from connection 11 to pass between the arms of yoke member 2, and it is curved outwardly and then upwardly to terminate in an integral connection with the shaft 1a. This connection provides for pivotal movement of the lever $L_1$ about the axis $v'v$ without any movement of the rod 14, but the pivotal movement of the lever $L_1$ about the axis $u'u$ causes the rod 14 to move the transmission shaft 8 axially. The free end of transmission shaft 3 is operatively connected to the internally splined sleeve 13 by means of an articulated linkage 15a, 15b, and 15c whereby rotation of transmission shaft 3 causes a corresponding rotation of the transmission shaft 8.

Two cylindrical members or drums 16, 17 are rotatably mounted in bearings on supporting members $S_1$ and $S_2$ (FIG. 5) which project outwardly from an upwardly extending portion of the platform C. The drums 16, 17 are rotatable about a vertical axis disposed in substantially perpendicular relationship with respect to the transmission shaft 8. The drums 16, 17 are provided with diametrically disposed slots or apertures 18 and 19, respectively, on their opposed end faces and each drum is adapted to control a different propulsion unit H or a related group of such units.

The drum 16 is provided with an internally mounted bell crank lever 20 which is pivotally mounted at its apex 22 on the upper end of an axial stem 24 disposed perpendicularly with respect to the transmission shaft 8. The axial stem 24 is stationary in the sense that it cannot move pivotally or longitudinally, but it is freely rotatable about its own axis. One arm of the bell crank lever 20 is provided with a bore for slidably receiving one end 27 of an articulated connection, the opposite end 26 being in turn slidably received in a corresponding bore provided in the end of the arm 9 of the second transmission shaft 8.

An annular guide member 30 is mounted on the upper end of a sleeve $m_1$ slidably mounted on the axial stem 24. The free end of bell crank lever 20 is received by the annular guide member 30 and the latter can move freely in an axial path in response to movement of the radial arm 9, acting through bell crank lever 20. Thus, any rotation of the crank lever 20 about its axis 22 results in a sliding movement of the sleeve $m_1$ along the axial stem 24. As will appear hereinafter, this sliding movement is used to control the rotational speed of the propeller in the associated propulsion unit, i.e. the magnitude of the thrust exerted by this propulsion unit. The sleeve $m_1$ is slidably mounted within a reduced portion $N_1$ of drum 16, which is in turn mounted on support member $S_1$ as referred to hereinabove.

The drum 17 is similarly provided with a bell crank lever 21 rotatably mounted at its apex 23 on the lower end of a stationary rotatable shaft 25. Bell crank lever 21 has one arm thereof connected to the radial arm 9 of transmission shaft 8 by means of an articulated connection 28, 29 slidably mounted in bores provided in the respective arms. The other end of the bell crank lever 21 is received in an annular guide member 31 mounted on the lower end of a sleeve $m_2$. The sleeve $m_2$ is rotatably mounted on a shaft 25 and is slidably mounted in a reduced upper portion $N_2$ of the drum.

In operation, the steering apparatus of FIGS. 4 and 5 will be described with reference to the diagram of FIGS. 6, 6a, 6b, and 6c to illustrate a first mode of operation. In this embodiment the two transmission shafts 3 and 8 are disposed parallel to the longitudinal axis Y'Y of the ship and the drum 16 is operatively connected to the propulsion unit $H_1$, while the drum 17 is operatively connected to the propulsion unit $H_2$. In the initial position illustrated in FIGS. 5 and 6, the slots 18 and 19 extend parallel with respect to the longitudinal axis Y'Y of the ship and the propulsion units $H_1$ and $H_2$ are directed, with their respective thrusts identically oriented in a rearward direction parallel to the axis Y'Y, as illustrated in FIG. 6a.

The reduced portions $N_1$ and $N_2$ of drums 16 and 17 are connected by meshing gear means 32 and 33, respectively to synchrotransmitter devices 34 and 35. The synchrotransmitter devices form part of separate synchrosystems $T_1$ and $T_2$, (FIGS. 3, 6, and 7) which are of a conventional type well known in the art and need not be described in detail here. It will be understood that each synchrotransmitter is operatively associated with a synchroreceiver and a reversible motor serving to rotate the respective propulsion unit about its vertical axis for adjusting the direction of rotation. Thus, the rotary movement of the propulsion units are directly controlled in accordance with the direction of movement of the synchrotransmitter and synchroreceiver. It will also be understood, however, that numerous types of operating mechanisms may be provided for continuously controlling the direction of thrust exerted by the respective propulsion units in accordance with the orientation of the respective slots 18 and 19 on the particular drum associated with such propulsion units.

With the heading control lever $L_2$ remaining stationary, the displacement control lever $L_1$ is shifted in the direction $\overrightarrow{AR}$ i.e. toward the stern of the ship along longitudinal axis Y'Y (FIG. 4). The displacement control lever $L_1$ rotating about the axis $u'u$ moves the curved rod 14 to cause transmission shaft 8 to be displaced longitudinally in the internally splined sleeve, away from the direction Y and toward the direction Y'. It will be seen that a telescopic connection, indicated by the letter $T_c$ in FIG. 4, automatically permits lost motion in the curved rod 14 to adjust to differences in length required by its movement with the end of the transmission shaft 8. The above-described sliding movement of the shaft 8 serves to move bell crank levers 20 and 21 in rotation from the position shown in full lines in FIG. 5 to the positions shown in dotted lines. This in turn moves the annular guide members 30 and 31 and the sleeves $m_1$ and $m_2$, serving to move toward each other the terminal connections $e_1$ and $e_2$ which are integral the latter. This movement is illustrated in FIGS. 4 and 5 by the directional arrow O, $+Z$.

Figures 6, 7:
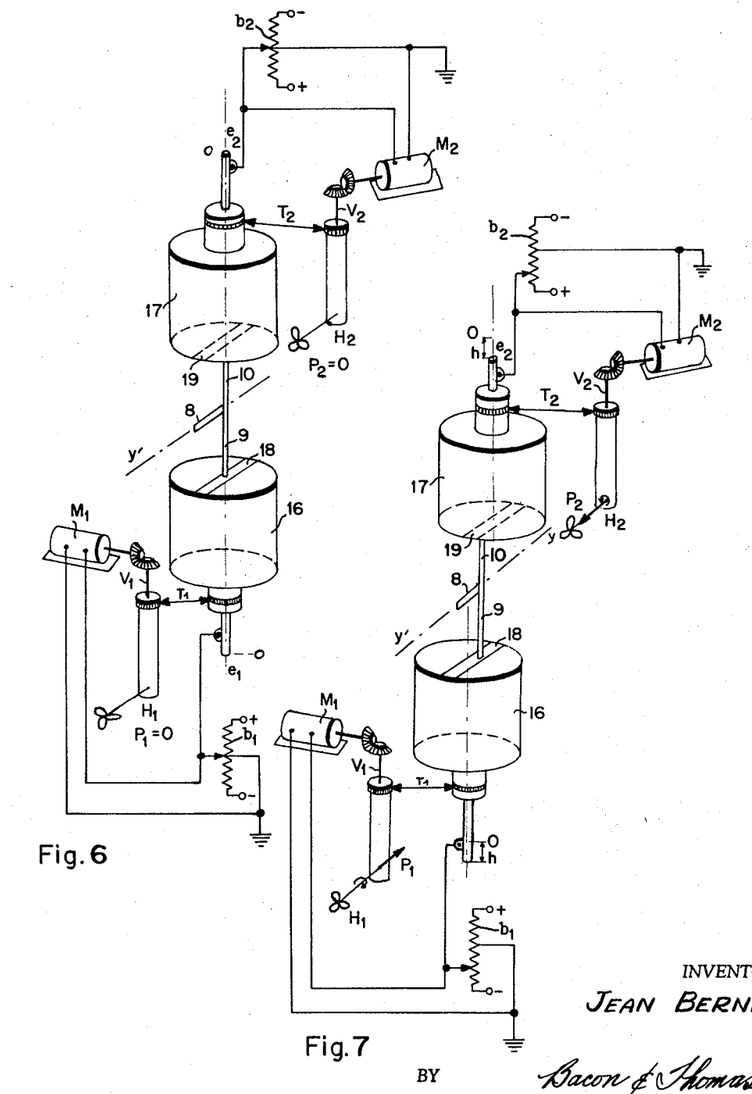
FIGS. 6, 6a, 6b, and 6c are schematic representations illustrating a first mode of operation of the steering system shown in FIGS. 2 through 5.
FIGS. 7, 7a, 7b, and 7c are schematic representations illustrating a second mode of operation of the same steering system.
Figures 6A, 6B:
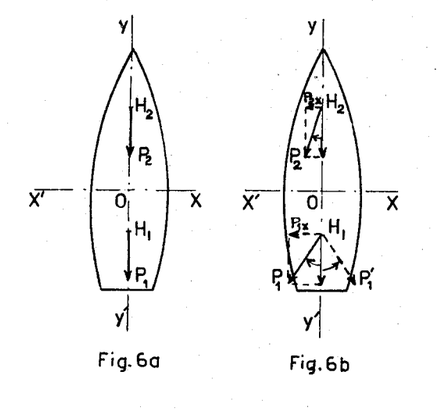

As the terminals $e_1$ and $e_2$ are moved vertically toward each other, this movement is transmitted by any known means to mechanical or electrical control means $b_1$ and $b_2$, respectively (FIG. 6). Control means $b_1$ and $b_2$ may, for example, comprise potentiometers when electric driving motors are being employed for the propulsion units, as shown in FIGS. 6 and 7, and they cause the propellers to be driven at the particular speeds and directions corresponding to the vertical displacements of terminals $e_1$ and $e_2$ with respect to their reference position O. Thus, as disclosed in FIG. 6a, two thrusts, $P_1$ and $P_2$, are provided, both being of the same magnitude and both being directed rearwardly along the longitudinal axis Y'OY of the ship N, and the ship will accordingly move forward.

Similarly, it will be understood that a shift of the displacement control lever $L_1$ towards the bow of the ship or in the direction AV shown in FIG. 4, will result in displacing the terminal connections $e_1$ and $e_2$ vertically away from each other, toward the position $-Z$ (FIG. 4). The control means $b_1$, $b_2$ can then selectively adjust the speed of rotation of the propellers in the direction opposite that previously described to cause two thrust forces, $P_1$ and $P_2$, to be directed toward the bow of the ship. The position O of the respective terminals $e_1$ and $e_2$ represents the dead point of the control means $b_1$, $b_2$, wherein the propeller will not be rotated in either direction.

Assuming now that the heading control lever $L_2$ remains fixed, the displacement control lever $L_1$ is shifted from the initial position illustrated in FIGS. 4 and 6a in the direction indicated by the arrow B, or to the left as shown. This causes the yoke member 2 to rotate on the axis of transmission shaft 3 without moving the curved rod 14, since the latter is free to rotate about the axis $v'v$ with respect to lever $L_1$. Rotary movement of the shaft 3 in turn rotates sleeve 13 through the articulated linkage 15a, 15b, and 15c to rotate the transmission shaft 8. This causes the arms 9 and 10 to rotate drums 16 and 17 in opposite directions through the articulated connections operating in slots 18 and 19, respectively.

Movement of the displacement control lever $L_1$ toward the left as indicated by the arrow B is intended to move the ship toward the left. Thus, it is necessary to provide a thrust vector $\overrightarrow{P_1}$ by the propulsion unit $H_1$ to act in conjunction with a thrust vector $\overrightarrow{P_2}$ provided by the propulsion unit $H_2$. It will be understood that if the drums 16 and 17 are installed to act in direct synchronism the propulsion unit $H_1$ would have provided a vector $\overrightarrow{P'_1}$ indicated in dotted lines in FIG. 6b when the lever $L_1$ is moved as described above. However, the two phase electric wires provided between the synchrotransmitter and the synchroreceiver in the synchrosystem associated with drum 16 are inverted, and thus, the prescribed movement of lever $L_1$ effects the thrust vector $\overrightarrow{P_1}$ shown in full lines. This corresponds to pivoting the propulsion unit in the opposite direction, to an angle of the same absolute value but of the opposite sign, with respect to the Y'Y axis.

Accordingly, shifting of the lever $L_1$ in the B direction, as shown in FIG. 4, results in the propulsion units $H_1$ and $H_2$ delivering thrusts $\overrightarrow{P_1}$ and $\overrightarrow{P_2}$, tending to move the ship toward the right. Movement of the lever $L_1$ in the opposite direction, indicated by the arrow T, will, of course, rotate the propulsion units $H_1$ and $H_2$ in the other direction to give a resultant thrust tending to move the ship toward the left.

It should be understood that in order to obtain an adjustment or setting of the system wherein the two thrusts $\overrightarrow{P_1}$ and $\overrightarrow{P_2}$ are equivalent to a resultant force either to the left or to the right without any torque whatsoever, the following relationship must exist:

$$\overrightarrow{P}_{1x} \cdot OH_1 = \overrightarrow{P}_{2x} \cdot OH_2$$

wherein $\overrightarrow{P}_{1x}$ and $\overrightarrow{P}_{2x}$ represent the components of vectors $\vec{P_1}$ and $\vec{P_2}$, respectively, on the transverse axis $X'X$, and wherein $OH_1$ and $OH_2$ represent the distance of the respective propulsion units $H_1$ and $H_2$ from the center of gravity O. This relationship can be established, for example, by providing arms 9 and 10 of selected lengths that are inversely proportional to the distances $OH_1$ and $OH_2$, respectively.

Figure 6C:
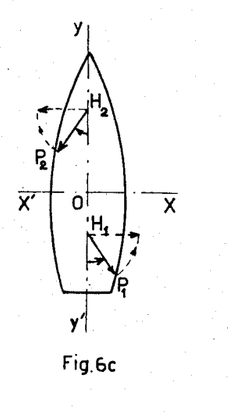

Let it be assumed now that the steering system of FIG. 4 is in the initial state described above, and the displacement control lever $L_1$ remains stationary while the heading control lever $L_2$ is pivoted in the direction B', i.e. toward the left of the ship. This will pivot the strut 4 about the shaft 3 to thereby move the transmission shaft 8 and its associated arms 9 and 10 toward the left of the ship, without any corresponding movement of the displacement control lever $L_1$. This, in turn, causes drums 16 and 17 to be rotated in the same direction about their respective axes (assuming that the upwardly extending portions of the crank levers 20 and 21 are inclined out from the vertical as shown in FIG. 4 so that the radial arms 9 and 10 are offset from the central axis of the drums 16 and 17), and accordingly, the propulsion units $H_1$ and $H_2$ will be rotated in opposite directions with respect to one another, as indicated in FIG. 6c, the drum 16 being connected in reverse through its associated synchrosystem to the propulsion unit $H_1$. The thrusts $\vec{P_1}$ and $\vec{P_2}$ are equal in magnitude since the vertical displacements of terminals $e_1$ and $e_2$ are identical.

When the heading control lever is moved far enough in the direction indicated by arrow B' the longitudinal slots 18 and 19 assume a position which is substantially at right angles with respect to the axial direction of transmission shaft 8. Thus, the thrusts $P_1$ and $P_2$ are moved to the positions indicated in dotted lines in FIG. 6c and effect to resultant torque driving the ship in rotation to the left. A corresponding rotation to the right can be similarly effected by shifting the handle $L_2$ in the direction indicated by the arrow T' in FIG. 4.

Figure 8:
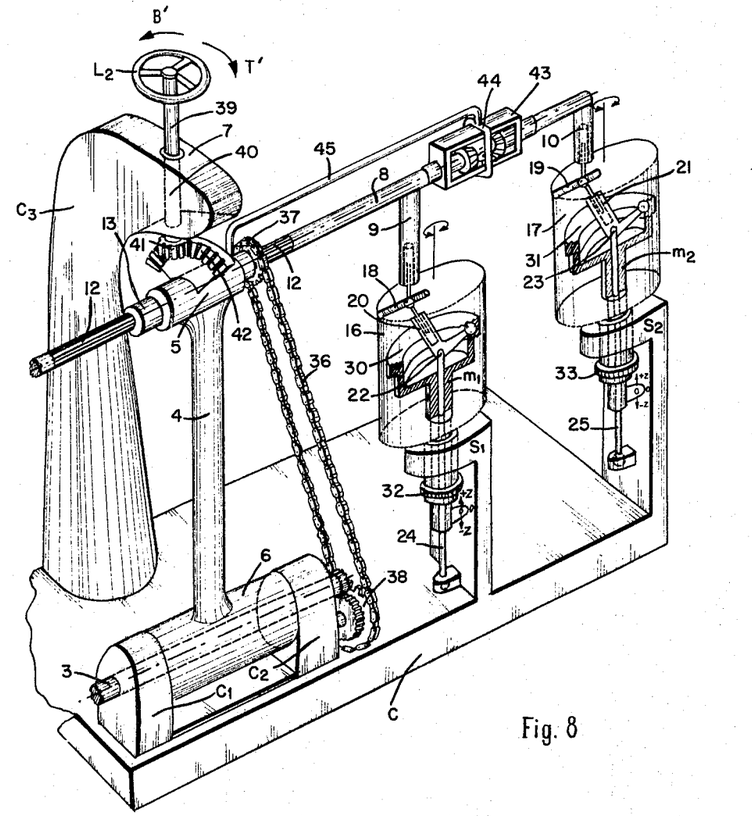
FIG. 8 is a fragmentary persepctive view of an alternative embodiment of the steering apparatus shown in FIGS. 4 and 5.

Another embodiment of the invention is illustrated in FIG. 8 wherein one portion only of the steering apparatus is disclosed, the remaining portion being identical to what is illustrated in the left-hand portion of FIG. 4. In this embodiment identical numerals have been employed to identify corresponding elements. Thus, there is a splined portion 12 on the upper transmission shaft 8 that is adapted to be rotated by an internally splined sleeve 13 which, in this instance is provided with an integral pionion 37. Pinion 37 in connected by a chain 36 to a second pinion suitably geared to the free end of the lower transmission shaft 3. In this embodiment it should be noted that the control member $L_3$ constitutes a wheel having a shaft 39 rotatably mounted in a bore 40 provided in the stanchion member $C_3$. The shaft 39 extends through bore 40 and is provided with a gear wheel 41 which engages a gear sector 42 fixed on the upper portion of the sleeve 5 with its teeth radially directed with respect to the axis of transmission shaft 3. Accordingly, rotation of the control $L_3$ serves to swing the upper transmission shaft 8 about the axis of the lower transmission shaft 3.

Another modification which has been adopted in the embodiment of FIG. 8 concerns the arrangement of the drums 16 and 17. In this instance, they are located in side-by-side relation adjacent one end of the upper transmission shaft 8. The arms 9 and 10 in this embodiment are both mounted in depending relation with respect to transmission shaft 8, the latter being provided with a gear box 43 to reverse the direction of rotation of drums 16 and 17 when the displacement control handle $L_1$ is shifted laterally. The transmission box 43 can be mounted by any suitable means, as by connecting the same to the adjacent end of upper sleeve 5 by a connecting bar 45 and a rectangular stirrup 44 in such a way as to permit free longitudinal movement along the axis of transmission shaft 8 without permitting any rotation of the gear box about this axis. Once again, the arms 9 and 10 are formed of predetermined lengths which are inversely proportional to the respective distances $OH_1$ and $OH_2$, i.e., the distances between the center of gravity O and the propulsion units $H_1$ and $H_2$ associated with the respective drums.

In operation, the inclinometer I and the gyrocompass G, or any other suitable means, serve to advise the pilot at all times of his position and heading. By moving the control lever $L_1$ to provide for translational displacements of the ship and the control lever $L_2$ to provide for rotation of the ship, the pilot can readily bring the ship to a predetermined position and heading, as indicated, for example, by the position A and the heading AD in FIG. 1. Such movements effect rotation of the drums 16 and 17 and/or vertical movement of the terminals $e_1$ and $e_2$ by the mechanical linkages broadly indicated by the letters C.M. in the block diagram of FIG. 3. As previously described, such movements effect rotation of the propulsion units about the vertical axes $V_1$ and $V_2$ and adjust the speed and rotational direction of the propellers through synchrosystems $T_1$ and $T_2$.

Figures 7A, 7B:
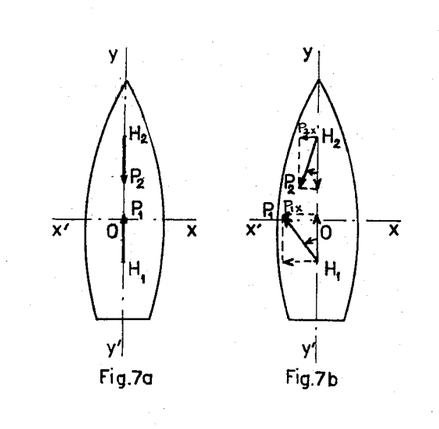

It will be understood that numerous other modifications may be made in the particular embodiment described hereinabove. For example, a different mode of operation can be provided by regulating the respective propulsion units so that there is an inoperative position for each of the levers $L_1$ and $L_2$ wherein the respective propulsion units apply to speed thrusts of equal absolute values wherein the ship will not move (see FIGS. 7 and 7a). This can be readily achieved by shifting the drums 16 and 17 along the longitudinal axis $Y'Y$ of the ship from the position illustrated in FIG. 10 where their axes are in alginment with their arms 9 and 10, respectively. Thus, with the drums 16 and 17 in the new positions shown in FIG. 7, it can be seen that the engines $M_1$ and $M_2$ exert respective thrusts $P_1$ and $P_2$ which are of equal magnitude but of opposite direction. This will occur because the displacement of drums 16 and 17 with respect to arm 9 and 10, respectively, correspond to equal displacement $h$ of the terminal $e_1$ and $e_2$ from their respective reference position O.

In this arrangement, when the heading control lever $L_2$ is fixed and the displacement control handle $L_1$ is moved in a forward or backward direction there is a corresponding vertical displacement of the terminals $e_1$ and $e_2$. This serves to increase the thrust exerted by one of the propulsion units while decreasing the thrust exerted by the second. Shifting of the lever $L_1$ in the direction represented by arrow AV will move the ship forward and shifting in the direction AR will move it backwards. This type of operation is referred to as differential.

Assuming now that the lever $L_2$ remains stationary and the lever $L_1$ is mover in the direction B or the direction T, the respective propulsion units $H_1$ and $H_2$ will be rotated to move the ship to the left or to the right. The following relationship will still apply:

$$\vec{P_{1x}} \cdot OH_1 = \vec{P_{2x}} \cdot OH_2$$

Figure 7C:
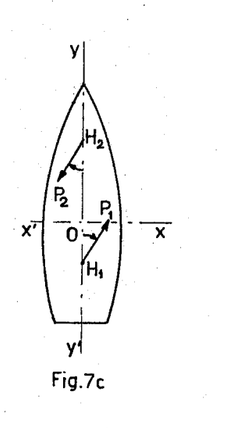

As long as the lever $L_1$ remains stationary any shifting of the lever $L_2$ in the B' direction will result in orienting the thrust forces in the respective directions shown in FIG. 7c and will effect a torque tending to rotate the ship to the left about its center of gravity O. Similarly, rotation of the ship to the right about its center of gravity O can be effected by shifting the lever $L_2$ in the direction T'.

It should be understood that it is not absolutely necessary to position the respective propulsion units $H_1$ and $H_2$ along the longitudinal axis of the ship and that they can, in fact, be located on either side of this axis as long as they are situated at points that are reasonably remote from the center of gravity O of the ship.

In one embodiment of the invention means are provided to prevent the arms 9 and 10 from taking their respective positions in alignment with the axial stem 24 and 25, since in this position it is impossible for the arm 9 and 10 to rotate the drums 16 and 17. This can be effected, for example, by making the longitudinal slots 18 and 19 of a length that is shorter than the radius of the drums 16 and 17 (as shown in FIG. 8). Thus, the terminals $e_1$ and $e_2$ will move vertically in only one direction from the respective reference positions O.

It should be further understood that the lever control means $L_1$ and $L_2$ are disclosed herein for the purposes of illustration as being adaptable for manual manipulation. It is contemplated, however, that these controls may be actuated by any mechanical, hydraulic or electrical means.

The disclosure presented herein is to be considered as being illustrative only and numerous other modifications and changes may be made without departing from the spirit of the invention or the scope of the annexed claims.

I claim:

1. A manually controlled mechanical steering system for dynamically positioning a floating installation provided with at least two propulsion units of adjustable thrust direction located at points remote from the center of gravity of said installation, said steering system comprising in combination:
   (a) a displacement control lever having a socket member provided at its lower end;
   (b) a yoke-shaped member having two arms pivotally mounted on said socket member;
   (c) a first transmission shaft integral with said yoke-shaped member and extending on the side thereof which is opposite to the arms of said yoke-shaped member, said first transmission shaft having its axis in the symmetry plane of said two arms of said yoke-shaped member;
   (d) at least two bearings whereon said first transmission shaft is pivotally mounted;
   (e) a lower sleeve pivotally mounted on said first transmission shaft between said bearings and rigidly connected with an upper sleeve for pivotal movement of said upper sleeve on the axis of said first transmission member;
   (f) a heading control member for controlling said pivotal movement of said upper sleeve;
   (g) a second transmission shaft splined along at least one portion of its length;
   (h) an internally splined sleeve rotatably mounted within said upper sleeve and slidably mounted on said second transmission shaft;
   (i) a connecting rod having a curved lower end portion pivotally mounted on an axis within said socket member for free pivotal movement in a direction transverse to the axis of said first transmission shaft, said connecting rod extending upwardly between the arms of said yoke member and being movable by rocking movement of said axis through movement of said displacement control lever in the vertical plane of said first transmission shaft;
   (j) a universal joint connecting one end of said second transmission shaft to the upper end of said connecting rod for free rotational movement of said second transmission shaft with respect thereto;
   (k) means for transmitting rotational movement of said first transmission shaft to said internally splined sleeve for rotation of said second transmission shaft in response to rotational movement of said first transmission shaft;
   (l) two radially directed arms mounted on the other end of said second transmission shaft, each of said arms being provided with a bore in the outer end thereof;
   (m) two drums for controlling the respective propulsion units, each of said drums being mounted adjacent the ends of said radially directed arms on an axis substantially perpendicular to the axis of said second transmission shaft, each of said drums having a diametrically disposed longitudinal slot provided in the end face thereof which is disposed adjacent the outer ends of the respective radially directed arms;
   (n) an annular guide member mounted for vertical movement within each of said drums;
   (o) a connecting sleeve fixedly secured to each of said annular guide members and extending outwardly therefrom through the other end faces of the respective drums for free sliding movement through openings provided therein;
   (p) a stem member mounted axially within each drum and serving to mount the respective sleeve for guided movement of said annular guide members;
   (q) a bell-crank lever mounted within each of said drums and being pivotally secured on the end of the respective axial stem therein, said bell-crank lever having one arm operatively engaging said annular guide member for controlling vertical movement thereof and having an axial bore provided in its second arm;
   (r) an articulated connecting member disposed between each of said radially directed arms and the second arm of the respective bell-crank lever provided in the adjacent drum, the opposite ends of the respective connecting members being slidably received for telescopic movement within the bores provided, respectively, in the ends of the said radially directed arms and said second arms;
   (s) means for controlling the direction of thrust exerted by each of the respective propulsion units in response to the position of rotation of the drum associated therewith;
   (t) means for controlling the magnitude of thrust exerted by each propulsion unit in response to the position of sliding movement of the axial sleeve associated with the corresponding drum.

2. A steering system according to claim 1, wherein said heading control member comprises a lever fixedly secured on the upper portion of said upper sleeve.

3. A steering system according to claim 1, wherein said heading control member is a rotational element connected by gear means to a gear sector mounted on said upper sleeve.

4. A steering system according to claim 1, wherein said means transmitting rotational movement to said internally splined sleeve comprises an articulated linkage connected between said first and second transmission shafts.

5. A steering system according to claim 1, wherein said means transmitting rotational movement to said internally splined sleeve comprises a chain and gear pinion means connecting said first and second transmission shafts.

6. A mechanical steering system for dynamically positioning a floating installation provided with at least two propulsion units rotatably mounted thereon located at points remote from the center of gravity of said installation to provide for adjustable directions of thrust, said steering system comprising: a displacement control lever operatively connected with a first transmission shaft for effecting rotational movement of said first transmission shaft in response to movement of said lever in a first direction, said first transmission shaft being unaffected by movement of said displacement control lever in a second direction transverse to said first direction thereto, a second transmission shaft mounted in spaced parallel relation with respect to said first transmission shaft for pivotal movement about the axis of said first transmission shaft in response to actuation of a heading control member connected thereto, means connecting said first transmission shaft to said second transmission shaft for rotation of the latter in response to rotation of the former, said second transmission shaft being also connected to said displacement control lever for axial movement of said second transmission shaft in response to movement of said displacement control lever in said transverse direction, two radial arm members mounted on said second transmission shaft, each of said radial arm members being operatively connected to a drum to effect displacement of said drums about their axes in response to rotation of said second transmission shaft, means for controlling the thrust direction of said propulsion units simultaneously in response to the rotational position of the respective drums, and means for controlling the magnitude of thrust exerted by said propulsion units in response to displacement of said radial arm members by axial movement of said second transmission shaft.

7. A mechanical steering system for dynamically positioning a floating installation provided with at least two propulsion units of adjustable thrust magnitude rotatably mounted thereon and located at points remote from the center of gravity of said installation to provide for adjustable directions of thrust, said steering system comprising: a transmission shaft; a pair of radial arms mounted on said transmission shaft and lying in a common axial plane, said shaft being mounted for axial movement, for lateral movement in a direction substantially at right angles to said axial plane containing said radial arms, and for rotational movement about its axis; control means connected with said transmission shaft, and operable to effect axial, lateral and rotational displacement thereof; a pair of rotatably mounted drums, each associated with one of said propulsion units; means connecting said radial arms with their associated drums, operable to effect rotation of said drums in response to displacement of said transmission shaft; means connected with said drums for varying the thrust direction of said propulsion units in response to rotational movement of said drums; a thrust control member associated with each drum, and movable in the direction of the axis of said drum; means for controlling the axial movement of each thrust control member in response to the displacement of the associated radial arm; and means for varying the thrust magnitude of each propulsion unit in response to axial movements of said thrust control member.

References Cited by the Examiner
UNITED STATES PATENTS 2,987,027 6/1961 Wanzer ____________ 114—144
3,187,704 6/1965 Shato et al. _________ 114—144

MILTON BUCHLER, *Primary Examiner.*

ANDREW H. FARRELL, *Examiner.*